United States Patent
Hsu et al.

(10) Patent No.: US 8,968,906 B2
(45) Date of Patent: Mar. 3, 2015

(54) COMPACT BATTERY COOLING DESIGN

(75) Inventors: Chih-Cheng Hsu, Rochester Hills, MI (US); Herman K. Phlegm, Oak Park, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 441 days.

(21) Appl. No.: 13/237,088

(22) Filed: Sep. 20, 2011

(65) Prior Publication Data

US 2013/0071700 A1    Mar. 21, 2013

(51) Int. Cl.
*H01M 10/50* (2006.01)
*H01M 10/613* (2014.01)
*H01M 10/647* (2014.01)
*H01M 10/6551* (2014.01)
*H01M 10/6567* (2014.01)

(52) U.S. Cl.
CPC ...... *H01M 10/5004* (2013.01); *H01M 10/5032* (2013.01); *H01M 10/5046* (2013.01); *H01M 10/5075* (2013.01)
USPC .......................................... 429/120; 429/163

(58) Field of Classification Search
None
See application file for complete search history.

(56) References Cited

U.S. PATENT DOCUMENTS

| 2003/0017383 | A1* | 1/2003 | Ura et al. | 429/120 |
|---|---|---|---|---|
| 2003/0148173 | A1* | 8/2003 | Gu | 429/62 |
| 2010/0273042 | A1* | 10/2010 | Buck et al. | 429/120 |
| 2010/0304203 | A1* | 12/2010 | Buck et al. | 429/120 |
| 2010/0310909 | A1* | 12/2010 | Yun et al. | 429/90 |
| 2011/0059347 | A1 | 3/2011 | Lee et al. | |
| 2011/0064985 | A1* | 3/2011 | Lee et al. | 429/120 |
| 2011/0070474 | A1* | 3/2011 | Lee et al. | 429/120 |
| 2011/0293985 | A1* | 12/2011 | Champion et al. | 429/120 |
| 2013/0004806 | A1* | 1/2013 | Wang | 429/50 |

OTHER PUBLICATIONS

Targray, "Aluminum Laminate Pouch", Publication, May 2011, pp. 1-2.

\* cited by examiner

*Primary Examiner* — Milton I Cano
*Assistant Examiner* — Carmen Lyles-Irving
(74) *Attorney, Agent, or Firm* — Dinsmore & Shohl LLP

(57) ABSTRACT

A battery module is described. The battery module includes the battery module includes a plurality of repeating frames; a plurality of battery cells positioned between the plurality of repeating frames, the battery cells having a flexible heat conducting covering, an edge of the heat conducting covering folded over an outside edge of the repeating frame; and a heat sink contacting the edge of the heat conducting covering folded over the edge of the repeating frame. A method of cooling a battery module is also described.

16 Claims, 4 Drawing Sheets

COMPACT BATTERY COOLING DESIGN

FILED OF THE INVENTION

This invention relates generally to batteries, and more particularly, to a battery thermal system with improved heat transfer efficiency.

BACKGROUND OF THE INVENTION

Current battery internal heat exchangers require numerous components and sealing connections, and complicated manufacturing processes. One known method for cooling battery cells is to bring two cells into face contact with a cooling fin through which coolant flows. The cooling fins are connected by integrating an inlet and outlet header hole on both sides of the fin. The inlet and outlet headers are then formed by stacking two or more fins together, and connecting the inlet and outlet header holes. An o-ring seal (or similar seal) may be used to form the seal between two fins. The seals for both inlet and outlet are typically integrated into a frame, which holds the cells and fins in place in the stack.

An example of this type of system is shown in FIG. 1. An expanded view of the battery pack 10 is shown. The battery cells 15 are separated by cooling fins 20. There is a cooling inlet 25 on one side of the cooling fin 20 and a cooling outlet 30 on the other side of the cooling fin 20. Coolant flows through channels 35 in the cooling fin 20. Heat from the battery cells 15 is conducted into the cooling fins 20. Two battery cells 15 and a cooling fin 20 can be contained in a frame 40. There are seals 45 on both sides of the cooling fin 15 for the cooling inlet 25 and cooling outlet 30. The seals 45 can be integrated into the frame 40. This arrangement requires multiple components and seals and a complicated assembly process.

In an alternate system shown in FIG. 2, the battery cells 15 and cooling fins 20 are placed in the frame 40. The cooling fins 20 have portion 22 which is placed between the battery cells 15 and an edge portion 24 perpendicular to the portion 22 which extends along the edge of the battery cell. Edge portion 24 is in contact with a heat sink 26.

SUMMARY OF THE INVENTION

One aspect of the invention is a battery module. In one embodiment, the battery module includes a plurality of repeating frames; a plurality of battery cells positioned between the plurality of repeating frames, the battery cells having a flexible heat conducting covering, an edge of the heat conducting covering folded over an outside edge of the repeating frame; and a heat sink contacting the edge of the heat conducting covering folded over the edge of the repeating frame.

Another aspect of the invention is a method of cooling a battery module. In one embodiment, the method includes: providing a battery module comprising: a plurality of repeating frames; a plurality of battery cells positioned between the plurality of repeating frames, the battery cells having a flexible heat conducting covering, an edge of the heat conducting covering folded over an outside edge of the repeating frame; and a heat sink contacting the edge of the heat conducting covering folded over the edge of the repeating frame; and circulating cooling fluid through the heat sink, the heat conducting covering transferring the heat generated in the plurality of battery cells to the heat sink over a contact area between the heat sink and the edge of the heat conducting covering.

DETAILED DESCRIPTION OF THE INVENTIONS

The new design provides a simple, more robust battery internal heat exchanger which improves cooling efficiency, reduces cost, improves cooling reliability, and simplifies the manufacturing process.

The design allows simplification of the battery internal heat exchanger. The aluminum-laminate covering of the battery cell is used directly as the cooling fin. The thermal connection between the edge of the covering and the heat sink is optimized because the heat conductive covering for the battery cell is in direct contact with the heat sink.

There are fewer seals with the present design than in some prior art designs because the coolant flow is only at the sides of the module, instead of between every battery cell or every other battery cell as with prior art systems.

In addition, the heat sink design is simple. There are also fewer components in the module because cooling fins are not required between the battery cells (although they could be included, if desired). This allows the battery modules to be smaller.

Manufacturing is easier because the stacking procedure is simple. In addition, only normal cleanliness standards are required because no seals are made during stacking.

Thus, the design provides lower material, manufacturing, and warranty costs.

Figure 1:
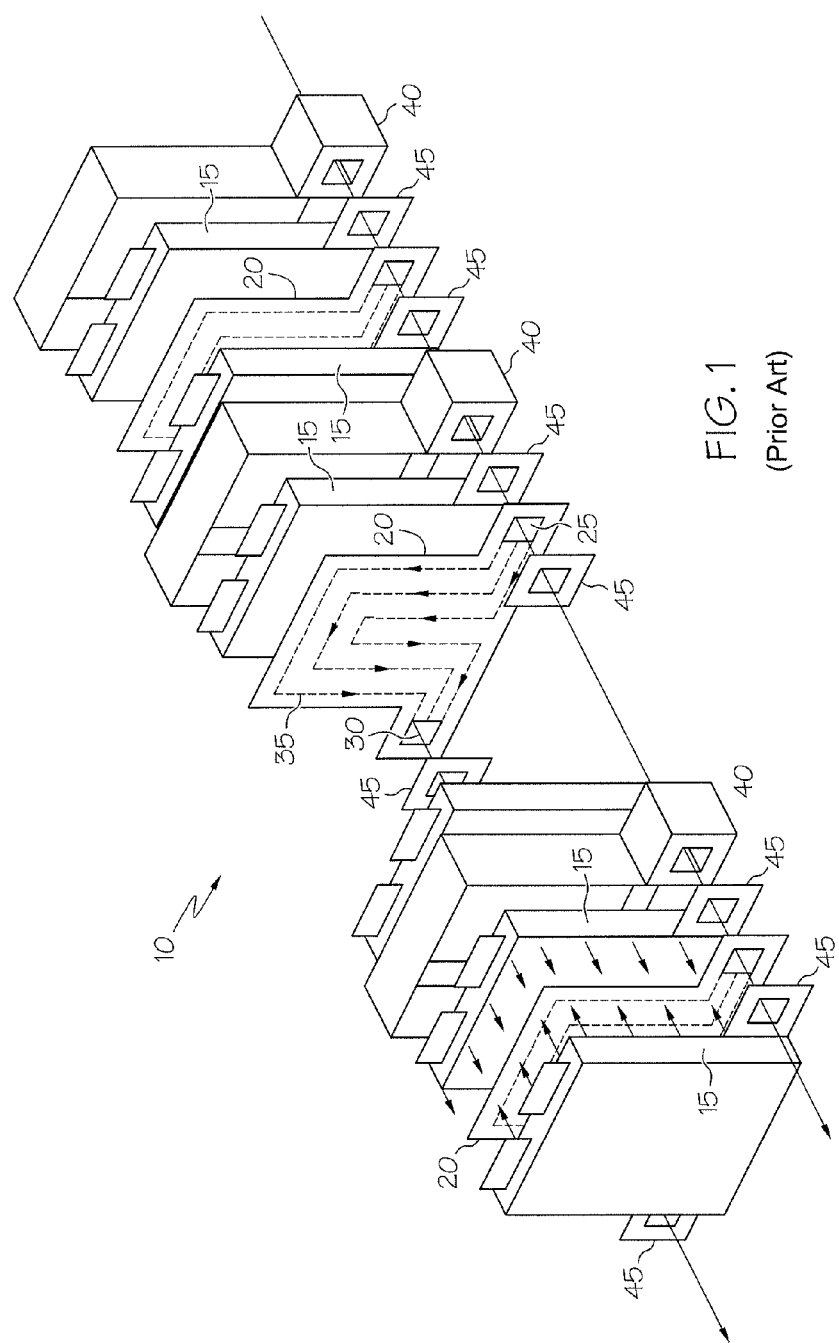
FIG. 1 is an illustration of a prior art method of cooling battery cells.
Figure 2:
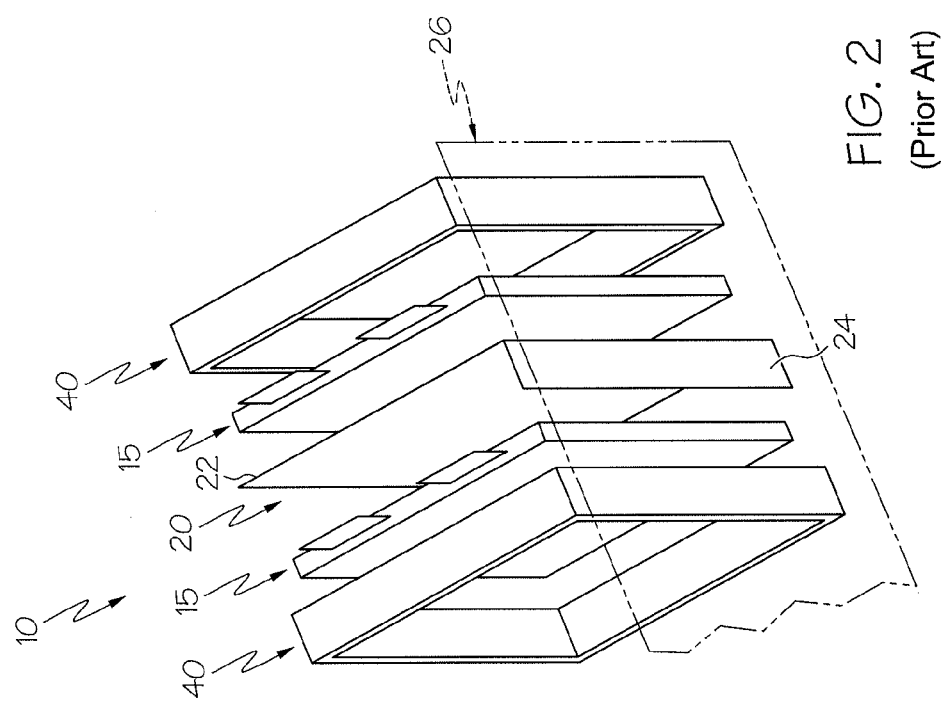
FIG. 2 is an illustration of an alternate prior art method of cooling battery cells.
Figure 3:
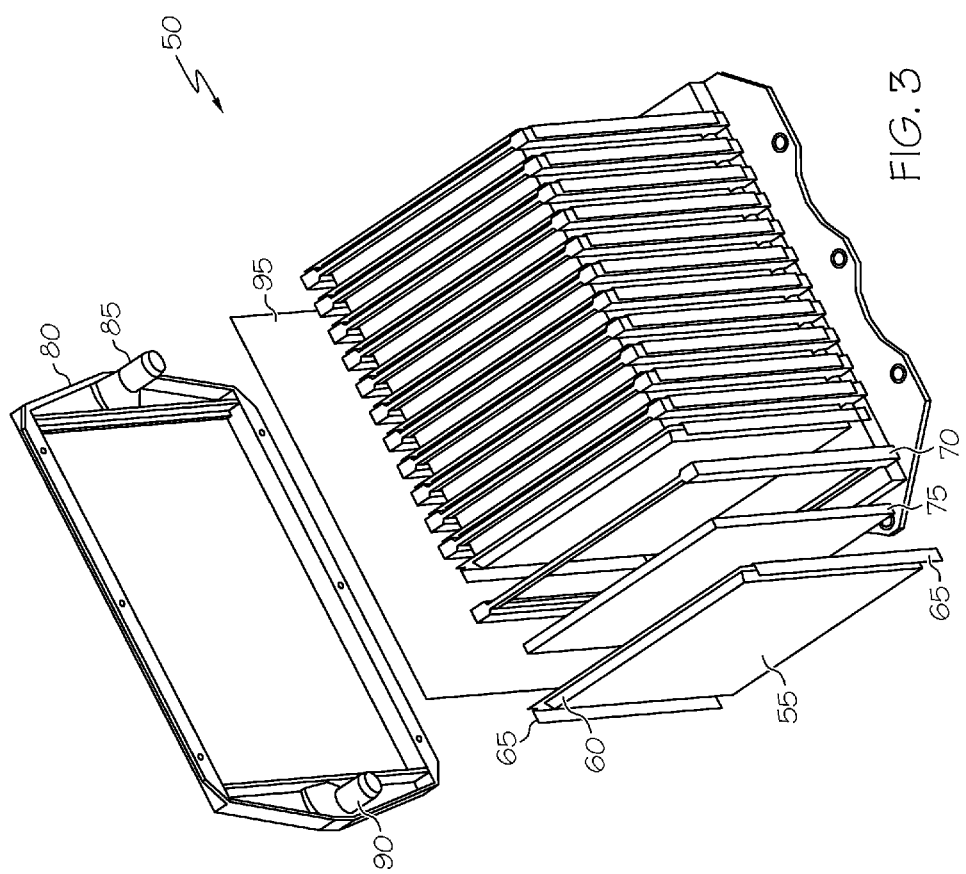
FIG. 3 is an illustration of one embodiment of a module heat exchanger of the present invention.

FIG. 3 shows one embodiment of the battery module 50. The battery module 50 includes the battery cells 55. The battery cells 55 are surrounded by a flexible heat conducting covering 60, which has extended edge fins 65 on at least one side, and desirably at least two sides. The flexible heat conducting covering is typically a metal laminate film, such as an aluminum laminate film, for example, The metal laminate film typically includes a layer of metal with layers of polymer on the faces of the metal (for example, nylon, or polyethylene terephthalate adhered to the metal with an adhesive such as polypropylene).

The battery module 50 includes repeating frames 70. The repeating frames 70 typically have an open center, although this is not required. The repeating frames 70 support the battery cells 55. The battery cells 55 can fit into one side of the repeating frame 70, if desired. The repeating frames 70 are typically made of a light-weight, non-conductive material. Suitable materials include, but are not limited to, plastics, such as polypropylene, nylon 66, and other low-conductive materials. The repeating frames can be fiber-reinforced for structural strength, if desired.

Figure 4:
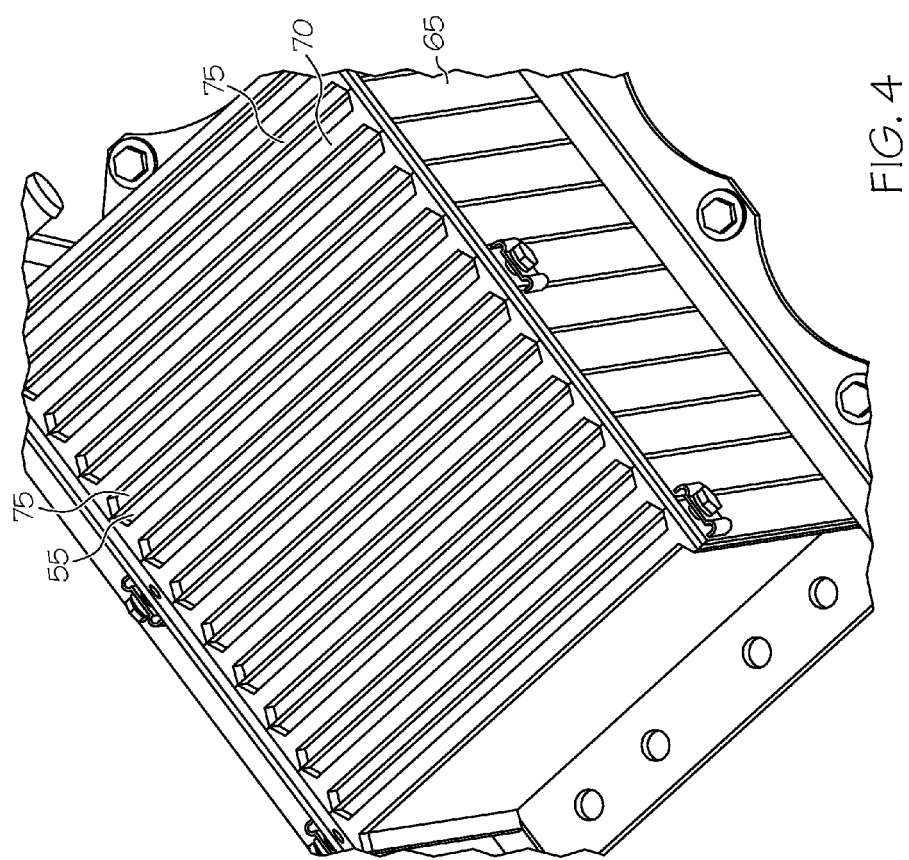
FIG. 4 is illustration of another embodiment of the module heat exchanger of the present invention.

As shown in FIG. 4, the battery module 50 can include expansion units 75 on one side of the battery cell between the battery cell 55 and the repeating frame 70 (i.e., battery cell/expansion unit/repeating frame/battery cell/expansion unit/repeating frame etc.), for example. Alternatively, there can be expansion units 75 on both sides of every battery cell 55. Other placement is also possible as would be understood by those of skill in the art (for example, an expansion unit every second or third etc. battery cell). The expansion units 75 can fit into the repeating frame 70, if desired. The expansion units 75 can be sheets of foam, for example. The expansion unit 75 compensates for the cell tolerance and expansion variation in the cell thickness direction.

The extended edge fins 65 of the flexible heat conducting covering, such as an aluminum laminate pouch, 60 are folded over the outside edge of the repeating frame 70 and are sandwiched between the edge of the repeating frame 70 and the heat sink 80. The heat sink 80 is mounted on at least one side of the module base 55 (typically both sides). The flexible heat conducting covering (e.g., aluminum laminate pouch) 60 and extended edge fins 65 directly conduct the heat generated in the battery cells 55 to the heat sinks 80. The direct contact between the heat conducting covering and the heat sink provides more efficient heat transfer. It has been estimated that the improvement in heat transfer efficiency will be about 0.5° C. cell temperature with a smaller variation (at 25° C. cold plate with 4 W of cell heat generation).

The heat sinks 80 have a channel through which the coolant is pumped. The heat sinks 80 can be formed by stamping two metal sheets (e.g., of aluminum) and brazing or welding them together, forming the channels. Because the heat sinks 80 are located on the sides of the module base 55, only one coolant inlet 85 and outlet 90 are needed for each heat sink. This eliminates the need for multiple seals for each cooling fin, and reduces the cost and complexity of the system.

The repeating frames 70 and expansion units 75 are stacked between the battery cells. In one embodiment, there can be repeating frames 70 and expansion units 75 between all of the battery cells (i.e., battery cell/expansion unit/repeating frame/battery cell/expansion unit/repeating frame etc.). However, other arrangements are possible, for example, arrangements in which there are repeating frames between all of the battery cells and expansion units every second or third etc. battery cell (i.e., battery cell, repeating frame, battery cell, expansion unit, repeating frame, etc.), or repeating frames and/or expansion units are between every two battery cells (i.e., 2 battery cells, expansion unit and/or repeating frame, 2 battery cells, etc.), or every three battery cells (i.e., 3 battery cells, expansion unit and/or repeating frame, 3 battery cells, etc.), etc.

A layer 95 of thermal interface material (TIM) can optionally be placed between the inner surface of the heat sink 80 and the surface formed by the extended edge fins 65 which is folded over the edge of the repeating frame 70.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "device" is utilized herein to represent a combination of components and individual components, regardless of whether the components are combined with other components. For example, a "device" according to the present invention may comprise an electrochemical conversion assembly or fuel cell, a vehicle incorporating an electrochemical conversion assembly according to the present invention, etc.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A battery module comprising:
a plurality of rectangular repeating frames arranged along a stacking axis; each of said frames having a top edge, bottom edge, and two side edges;
a plurality of generally planar battery cells positioned between the plurality of repeating frames to define a facingly-adjacent relationship therebetween, each of said battery cells covered by a flexible heat conducting pouch including an integral extended edge fin that is folded over along at least one side edge of each repeating frame;
an expansion unit comprising a layer of foam between the battery cells and the repeating frames; and
a heat sink in direct thermal contact with said integral extended edge fin that is folded over along at least one side edge of each repeating frame; wherein said integral extended edge fin is positioned between the edge of said repeating frame and said heat sink; and wherein said pouch and said integral extended edge fin directly conduct heat from said battery cells to said heat sink.

2. The battery module of claim 1 further comprising an expansion unit on at least one side of every battery cell.

3. The battery module of claim 1 wherein the heat conducting covering is an aluminum laminate material.

4. The battery module of claim 1 wherein said heat sink contacts opposite edges of the repeating frame.

5. The battery module of claim 1 further comprising a layer of thermal interface material between the edge of the heat conducting covering folded over the repeating frame and the heat sink.

6. The battery module of claim 1 wherein there is the repeating frame between adjacent battery cells.

7. The battery module of claim 1 wherein the heat sink has a coolant inlet and a coolant outlet.

8. A method of cooling a battery module comprising:
providing a battery module comprising:
a plurality of rectangular repeating frames arranged along a stacking axis; each of said frames having a top edge, bottom edge, and two side edges;
a plurality of generally planar battery cells positioned between the plurality of repeating frames defining a facingly-adjacent relationship therebetween, the battery cells covered by a flexible heat conducting pouch surrounding each battery cell and including an integral extended edge fin that is folded over along at least one side edge of each repeating frame;
a foam layer expansion unit between the battery cells and the repeating frames; and
a heat sink in direct thermal contact with the integral extended edge fin of the heat conducting pouch;

wherein said integral extended edge fin is positioned between the edge of said repeating frame and said heat sink; and circulating cooling fluid through the heat sink, wherein the heat conducting covering and integral extended edge fin transfer heat generated in the plurality of battery cells to the heat sink.

9. The method of claim 8 further comprising an expansion unit on at least one side of every battery cell.

10. The method of claim 8 wherein the heat conducting covering is an aluminum laminate.

11. The method of claim 8 said heat sink contacts opposite edges of the repeating frame.

12. The method of claim 8 further comprising a layer of thermal interface material between the edge of the heat conducting covering folded over the repeating frame and the heat sink, and wherein the heat generated in the plurality of battery cells is transferred to the heat sink through the layer of thermal interface material.

13. The method of claim 8 wherein each repeating frame is between adjacent battery cells.

14. A battery module comprising:

a plurality of rectangular repeating frames arranged along a stacking axis; each of said frames having a top edge, bottom edge, and two side edges;

a plurality of foam layer expansion units, one side of the expansion unit adjacent to one side of each repeating frame from said plurality of repeating frames;

a plurality of generally planar battery cells arranged within said frames to define a facingly-adjacent relationship between adjacent ones of said battery cells, one side of the battery cells adjacent to the other side of the expansion units, the battery cells covered by a flexible heat conducting pouch surrounding each battery cell including an integral extended edge fin that is folded over along at least one side edge of each repeating frame; and a heat sink in direct thermal contact with the integral extended edge fin that is folded over along at least one side edge of each repeating frame; wherein said integral extended edge fin is positioned between the edge of said repeating frame and said heat sink; and wherein said pouch and said integral extended edge fin directly conduct heat from said battery cells to said heat sink.

15. The battery module of claim 14 wherein the heat conducting covering is an aluminum laminate material.

16. The battery module of claim 14 wherein said heat sink contacts opposite edges of the repeating frame.

\* \* \* \* \*